(12) United States Patent
Brentrup et al.

(10) Patent No.: US 8,540,830 B2
(45) Date of Patent: Sep. 24, 2013

(54) METHOD OF PRODUCING A THERMOPLASTICALLY MOLDABLE FIBER-REINFORCED SEMIFINISHED PRODUCT

(75) Inventors: Karl Ludwig Brentrup, Moeriken (CH); Harri Dittmar, Battenberg (DE)

(73) Assignee: Quadrant Plastic Composites, AG, Lenzburg (CH)

( * ) Notice: Subject to any disclaimer, the term of this patent is extended or adjusted under 35 U.S.C. 154(b) by 0 days.

(21) Appl. No.: 13/435,477

(22) Filed: Mar. 30, 2012

(65) Prior Publication Data

US 2012/0181716 A1 Jul. 19, 2012

Related U.S. Application Data

(63) Continuation of application No. 12/688,977, filed on Jan. 18, 2010, now abandoned, which is a continuation of application No. 11/397,773, filed on Apr. 4, 2006, now abandoned, which is a continuation-in-part of application No. 10/472,530, filed on Oct. 24, 2003, now Pat. No. 7,132,025, and a continuation-in-part of application No. 10/470,969, filed on Dec. 4, 2003, now abandoned.

(30) Foreign Application Priority Data

Apr. 5, 2005 (EP) .................................. 05 007 391
May 4, 2005 (EP) .................................. 05 009 770

(51) Int. Cl.
*B29C 43/48* (2006.01)
*B29C 70/12* (2006.01)
*B29C 70/50* (2006.01)
*B32B 17/04* (2006.01)

(52) U.S. Cl.
USPC ...... 156/62.2; 156/77; 156/309.6; 156/583.5; 264/120; 264/123

(58) Field of Classification Search
USPC ........... 156/62.2, 62.4, 77, 245, 309.6, 583.5; 264/115, 116, 120, 123; 425/371
See application file for complete search history.

(56) References Cited

U.S. PATENT DOCUMENTS 3,063,883 A  11/1962  Brissette
3,616,031 A  10/1971  Fleissner (Continued)

FOREIGN PATENT DOCUMENTS

DE  3420132 A1  12/1984
DE  3614533      11/1987

(Continued)

OTHER PUBLICATIONS

English Abstract corres. to EP0593716.

(Continued)

*Primary Examiner* — Michael Tolin
(74) *Attorney, Agent, or Firm* — Brooks Kushman P.C.

(57) ABSTRACT

A continuous method for producing a thermoplastically moldable semifinished product of a thermoplastic material and reinforcing fibers, comprises blending thermoplastic fibers and reinforcing fibers together to form a nonwoven blend, consolidating the nonwoven blend by needling or by a thermal treatment, heating the consolidated nonwoven blend to a temperature above the softening temperature of the thermoplastic, compressing the consolidated nonwoven blend successively in a heated compression mold and in a cooled compression mold at a pressure of less than 0.8 bar for at least 3 seconds, and optionally applying functional layers to the semifinished product. The preferred product is a thermoplastically moldable semifinished product of a thermoplastic material and reinforcing fibers with an average length of 20 to 60 mm and an air pore content of 35 to 65 vol %.

21 Claims, 2 Drawing Sheets

(56) References Cited

U.S. PATENT DOCUMENTS

| | | | |
|---|---|---|---|
| 3,865,661 | A | 2/1975 | Hata et al. |
| 3,876,745 | A | 4/1975 | Fleissner |
| 4,195,112 | A | 3/1980 | Sheard et al. |
| 4,199,635 | A | 4/1980 | Parker |
| 4,258,093 | A | 3/1981 | Benedyk |
| 4,418,031 | A | 11/1983 | Doerer et al. |
| 4,424,250 | A | 1/1984 | Adams et al. |
| 4,501,856 | A | 2/1985 | Harpell et al. |
| 4,543,288 | A | 9/1985 | Radvan et al. |
| 4,568,581 | A | 2/1986 | Peoples, Jr. |
| 4,582,554 | A | 4/1986 | Bell et al. |
| 4,670,331 | A | 6/1987 | Radvan et al. |
| 4,690,860 | A | 9/1987 | Radvan et al. |
| 4,734,321 | A | 3/1988 | Radvan et al. |
| 4,780,359 | A | 10/1988 | Trask et al. |
| 4,784,902 | A | 11/1988 | Crompton |
| 4,882,114 | A | 11/1989 | Radvan et al. |
| 4,923,547 | A | 5/1990 | Yamaji et al. |
| 4,948,661 | A | 8/1990 | Smith et al. |
| 4,978,489 | A | 12/1990 | Radvan et al. |
| 5,134,016 | A | 7/1992 | Geary, Jr. et al. |
| 5,145,626 | A | 9/1992 | Bastioli et al. |
| 5,164,141 | A | 11/1992 | Becker et al. |
| 5,492,580 | A | 2/1996 | Frank |
| 5,569,425 | A | 10/1996 | Gill et al. |
| 5,721,177 | A | 2/1998 | Frank |
| 5,854,149 | A | 12/1998 | Nagayama et al. |
| 7,244,501 | B2 | 7/2007 | Raghavendran |
| 2001/0032696 | A1 | 10/2001 | Debalme et al. |
| 2003/0060113 | A1 | 3/2003 | Christie et al. |
| 2004/0053003 | A1 | 3/2004 | Coates et al. |
| 2004/0177911 | A1 | 9/2004 | Dittmar |

FOREIGN PATENT DOCUMENTS

| | | |
|---|---|---|
| DE | 19520477 | 12/1996 |
| DE | 10114554 A1 | 9/2002 |
| DE | 10319967 A1 | 11/2004 |
| EP | 0631862 | 1/1995 |
| EP | 0 647 519 A | 4/1995 |
| EP | 0 593 716 | 10/1998 |
| EP | 0888856 A | 1/1999 |
| WO | WO 88/09406 | 12/1988 |
| WO | WO 98/35086 | 8/1998 |
| WO | WO 01/32405 | 5/2001 |
| WO | WO 02/062563 | 8/2002 |
| WO | WO 02/076711 | 10/2002 |
| WO | WO 03/086725 | 10/2003 |

OTHER PUBLICATIONS

English Abstract corres. to WO8809406.
English Abstract corres. to DE3614533.
English Abstract corres. to DE19520477.
English Abstract corres. to EP0631862.
English Abstract corres. to DE10114554.
English Abstract corres. to EP0647519.
English Abstract corres. to EP0888856.
English Abstract corres. to DE3420132.
English Abstract corres. to DE10319967.
English Abstract corres. to WO0132405.
English Abstract corres. to WO9835086.
English Abstract corres. to WO02062563.
English Abstract corres. to WO02076711.

METHOD OF PRODUCING A THERMOPLASTICALLY MOLDABLE FIBER-REINFORCED SEMIFINISHED PRODUCT

CROSS-REFERENCE TO RELATED APPLICATIONS

This application is a continuation of U.S. application Ser. No. 12/688,977, filed Jan. 18, 2010, now abandoned, which is a continuation of U.S. application Ser. No. 11/397,773, filed Apr. 4, 2006, now abandoned, which is a continuation-in-part of U.S. application Ser. Nos. 10/472,530, filed Oct. 24, 2003, now U.S. Pat. No. 7,132,025 issued Nov. 7, 2006. U.S. Ser. No. 10/470,969, filed Dec. 4, 2003 now abandoned; European Patent Application No. EP 05 007 391.5 filed Apr. 5, 2005; and European Patent Application No. EP 05 009 770.8 filed May 4, 2005, priority to all of which are hereby claimed.

BACKGROUND OF THE INVENTION

1. Field of the Invention

This invention relates to a method for producing a thermoplastically moldable fiber-reinforced semifinished product from a mixed nonwoven containing thermoplastic fibers and reinforcing fibers.

2. Background Art

Thermoplastically moldable semifinished products containing reinforcing fibers, in particular glass fibers, are being used to an increasing extent for the production of moldings, in particular for automotive parts. Such "plastic panels" are characterized by high strength and toughness. GMT semifinished products are manufactured on a large scale industrially by combining continuous glass fiber strand mat and molten thermoplastic films in a double band press. This procedure consumes a substantial amount of energy, because the viscous melt must be pressed into the mat at pressures far above 1 bar. It is thus exceptionally difficult, in practice, to achieve a fiber content greater than 45 wt % and an areal weight below 2000 g/m$^2$ by this method. Since the reinforcing fibers in the reinforcing fibers in the glass mats are generally in the form of fiber bundles or "strands", impregnation with thermoplastic is never entirely complete and uniform, and therefore microscopically heterogeneous regions are present, thus resulting in a high standard deviation in the mechanical properties. This is also the case with thermally expanded GMT, which, due to the restoring forces of the glass fibers needled together, contains air pores which are irregularly distributed within the matrix.

German Patent Application DE-A 36 14 533 describes a method for producing molded articles of thermoplastics which contain a reinforcing insert. Based on textile fiber technology, a nonwoven blend of thermoplastic fibers and reinforcing fibers is produced by carding or air-laying methods and is consolidated, for example, by needling. Cut sections of this nonwoven blend are heated and pressed directly to form three-dimensional molded articles without prior consolidation into a semi-finished product. Complete impregnation is very difficult to obtain, especially with components having a complex shape, so that the mechanical properties of the moldings leave much to be desired.

According to WO 98/3508, in a complex method, blended strands of reinforcing fibers and thermoplastic fibers are first produced and then a nonwoven is produced from them. This nonwoven is pressed on a double band press at high temperature and high pressure to form a semifinished product. Production of mixed strands of reinforcing fibers and thermoplastic fibers is difficult due to the differing tensile elongations and modulus of the different fibers, and only a limited selection of blends is commercially available.

WO 02/062563 describes a continuous method for producing thermoplastically moldable thin semifinished products of a thermoplastic and long reinforcing fibers by dry blending thermoplastic fibers and reinforcing fibers to form a nonwoven blend; consolidating the fiber blend by needling; heating the consolidated nonwoven blend; compressing, employing a calender or a pair of pinch rollers to form a semifinished product, and optionally, laminating a functional layer thereto. Sheet products produced in this manner are dense and have surface irregularities such as waviness.

WO 02/076711 describes a method similar to that of WO 02/062563 for producing thick nonwoven blends, wherein the step of compressing can also be performed by a laminating device at pressures between 1 bar and 10 bar. However, it has been found that at such high pressures the air pores are forced almost completely out of the softened nonwoven blend and the melt flows apart in length and width, resulting in an uncontrolled variation in areal weight and in distortion of the semifinished product, with the result that the boundaries of the semifinished product are wavy rather than smooth and straight.

Similar problems arise in the methods according to EP-B 593 716 and U.S. Pat. No. 4,978,489 in which the nonwoven blend is compression molded by pressure rollers facing each other. In this process, the mat is compressed so strongly that the resulting semifinished product contains maximally only 20 vol %, and preferably 10 to 15 vol % of air pores. In the method according to U.S. Pat. No. 4,948,661 a mixed nonwoven is compressed between heated plattens or a double band press until the air is completely eliminated from the consolidated product.

The compression of mixed nonwovens in calenders or by pressure rollers has the further disadvantage that only low production speeds can be used and that a bulge is formed by the abrupt compression in the gap between rollers, which may result in strong distortion and even the formation of holes.

WO 03/086725 describes an apparatus and a process for making fiber-reinforced composites involving molding a mixed nonwoven mat in a continuous compression belt at relatively high pressure, up to 30 bar. "Pseudo-foamed composite sheets" are said to result from this process, but the air pore content is necessarily very low, and the high pressure will cause distortion of the non-woven and non-homogenous pore distribution. The sheet materials have a very high thermoplastic content, and thus strength and modulus are relatively low.

Published German Application DE-A 195 20 477 discloses a fiber reinforced sheet or panel that is thermally expanded and thus contains air pores. As discussed further below, these air pores are very irregularly distributed in the panel, whereas the air pores in the semifinished product of the present invention are uniformly distributed. The difference can easily be recognized in SEM pictures. Example 1, shows an expanded panel whose weight per unit of area is much greater than 2000 g/m$^2$. The length of the glass fibers is 100 mm, and the content of glass fibers is 30 wt %.

Published German EP-A-758577 discloses a stampable sheet prepared by a papermaking process wherein reinforcing fibers, thermoplastic fibers, and optionally non-fibrous thermoplastic particles are deposited on a foraminous screen from dispersion in water, dried, heated above the thermoplastic melt temperature, and then pressed in a cold press to form a dense stampable sheet. This sheet is then heated agin and allowed to freely expand by a factor of 1.1 to 15. A high pressure, for instance 5 kgf/cm² (about 5 bar) in Example 1 of the publication, is used to produce the dense intermediate.

SUMMARY OF THE INVENTION

Therefore, an object of this invention is to provide a simple continuous method of producing a distortion-free semifinished product of thermoplastic material and reinforcing fibers which contains air pores with a uniform distribution, and which can be readily reshaped by thermoforming to provide finished parts having excellent and highly reproducible properties in all directions. This and other objects are achieved by the inventive method, wherein individual thermoplastic fibers and individual reinforcing fibers are blended to form a mat of blended fibers, the mat is consolidated, preferably by needling, and is compressed twice, first in a heated compression mold, followed immediately by a cooled compression mold, in both cases at a pressure of less than 0.8 bar, to form an intermediate product which contains a uniform distribution of reinforcing fibers, thermoplastic, and air pores, the latter exceeding 25% by volume.

DETAILED DESCRIPTION OF THE PREFERRED EMBODIMENT(S)

Figure 1:
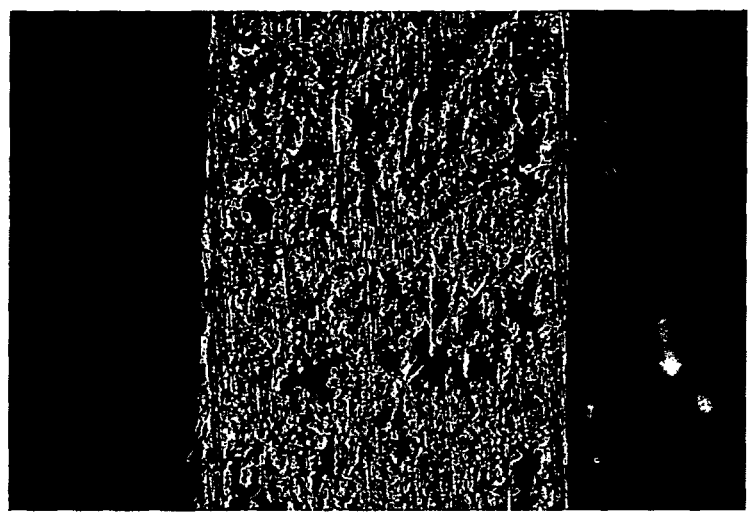
FIG. 1 is an SEM of an intermediate product of the present invention, showing a uniform porosity.

The process steps may be described in greater detail as follows:

Thermoplastic fibers and individual, nonbonded reinforcing fibers are blended together. Suitable thermoplastics include all spinnable thermoplastics, e.g., polyolefins such as polyethylene and polypropylene, polyamides, linear polyesters, thermoplastic polyurethanes, polycarbonates, polyacetals, and the corresponding copolymers and thermoplastic blends, as well as polymers having high thermal stability, such as polyarylates, polysulfones, polyimides, polyetherimides and polyether ketones. Particularly preferred is polypropylene with an MFI (230° C., 2.16 kp) according to DIN 53735 greater than 20 g/10 min, in particular between 25 and 150 g/10 Min. The thermoplastic fibers generally have an average length (weight average) of 20 mm to 100 mm.

Preferred reinforcing fibers are glass fibers, but carbon fibers, basalt fibers and Aramid fibers may also be used. Furthermore, natural fibers, e.g., those made of flax, jute, hemp, kenaf, sisal and cotton are also useful. Of special interest are basalt fibers which, in contrast to glass fibers do not melt and form a slag when fiber-reinforced finished parts are thermally processed. The relatively expensive basalt fibers are preferably mixed with natural fibers in a weight ratio of 10:90 to 50:50. In general, the reinforcing fibers have an average length (weight average) of 20 mm to 100 mm. In order to be readily blendable with thermoplastic fibers, they must be substantially in the form of individual nonbonded fibers, i.e., they must not remain bonded together with polymer binders.

The reinforcing fibers may be supplied as precut or "staple" fibers, or may be cut to length shortly prior to the blending operation. In general, fibers, whether precut or cut just prior to use, are in the form of multifilament strands. These strands must be capable of substantial individualizing of fibers. Of course, some fibers will generally be present in strands or partial strands, but the substantial majority of fibers will be present in individual form. To achieve this end, it is preferable that polymeric binders and the like be absent, or present in minimal amounts such that the strands may be "opened" by conventional textile equipment. Carding, for example, is highly efficient in opening strands of fibers. The fibers may be dry or may be in the form of precut and only partially dried fibers.

In a preferred process, the thermoplastic and reinforcing fibers are supplied in the form of multi-fiber strands, are blended in an air stream, and deposited on a moving belt. The fibers, which at this stage are in the form of strands, partially opened strands, and fibers, are subjected to one or more carding operations. Following carding, the number of unopened and partially opened strands is low, and the mat appears to be relatively homogenous. Following needling, a very homogenous appearance is achieved, with virtually no strands observable to the eye. The mat product is lofty and contains in excess of 75% air pores, generally greater than 90%. A thickness or "loft" of 2.5 cm to 15 cm prior to needling is typical, depending on the desired areal weight of the final product.

In a preferred embodiment of the invention, the average lengths of the thermoplastic fibers and of the reinforcing fibers differ by maximally 25%, preferably by maximally 10% and in particular, by maximally 3%. The preferred glass fibers are commercially available as endless fibers or as cut fibers with lengths of 0.5 inch (12.7 mm). In addition, cut fibers with a length of e.g. 1 inch (25.4 mm) or 2 inches (50.8 mm) are also available. In practice, the thermoplastic fibers are cut to approximately the same length as the glass fibers; i.e. in a particularly preferred embodiment of the invention both polypropylene fibers and glass fibers which have approximately the same length and which have an average length (weight average) in the range of 25 mm to 55 mm are employed.

This matching of fiber lengths has the advantage that during the production of the semifinished product, demixing of the fibers, which would result in inhomogeneities in the semifinished product, i.e. in glass-rich and polymer-rich domains, surprisingly does not occur. This is especially important if the fibers are blended by the airlay process.

The thermoplastic fibers and reinforcing fibers are used in a weight ratio of 10:90 to 80:20, preferably 20:80 to 65:35, and in particular 25:75 to 55:45. In the blending process the glass fibers should be relatively dry which means that their water content should be less than 6 wt. % preferably 0.5 to 4 wt. %. Blending is preferably performed according to the airlay or carding processes which are well-known in the textile technology. It has been surprisingly discovered that the carding process is relatively insensitive to water content, and thus the fibers can contain up to 15 wt. % of water. Blending results in a non-woven continuous mat preferably having an areal weight of 200 to 2500 g/m², more preferably from 250 to 1500 g/m². Upon mixing the fibers, glass fiber bundles are opened to a large extent or completely so that most or all of the glass the fibers are present as individual filaments.

The nonwoven blend thus obtained is then consolidated, preferably by needling on one or both sides. This may be accomplished with felting needles on conventional needling looms. Needling causes some breakage of the reinforcing fibers, so that the average fiber length is reduced; on the other hand, needling consolidates the nonwoven blend, so that it can be handled without problems in subsequent steps of the process. It is also possible, in principle, to perform the consolidation by thermal means, e.g., by IR irradiation or by means of hot air. However, in this case, the thermoplastic fibers should not melt completely, but rather should melt only superficially, to the extent that a semifinished product will have sufficient cohesion for ease of handling and transportability.

The needling operation causes a considerable decrease in the loft of the mat. The loft may decrease by from 25% to 90% of the loft of the material following carding, for example. However, the product at this stage still generally contains a very high amount of porosity. Only during the heated and cooled compression steps described below is the porosity reduced to the desired final product specification. For example, a blend of polypropylene fibers and glass fibers formed into a web of ca. 1000 g/m$^2$ by the air lay process will have a thickness of about 100 mm, of which >99% will be porosity. Needling reduces this thickness to about 15 mm, however the product is still very porous, with a porosity of 93% or more. Consolidation as described herein to a thermoformable intermediate product of 2 mm thickness results in a boardy product still having about 50% air voids. Upon full consolidation by thermoforming, the air void content of the 1 mm thick product is reduced to less than 5%. This is considered "full density," as in most cases, complete elimination of porosity cannot be achieved.

Thus, the subject invention is also directed to a process for the stepwise consolidation of a composite material of reinforcing fibers and thermoplastic fibers, comprising forming a blended, lofty web having a void content, V, of preferably from 85% to >99%, more preferably 90 to 99%, consolidating this web in one or more thickness reducing operations, at least one of which is a needle punching operation, until the void content is reduced to between 0.85V to 0.95V, and further consolidating by heating the web to a temperature greater than the melting point of the thermoplastic fibers and compressing in a double band press as described herein until the porosity of the cooled intermediate product is in the range of 0.25 V to 0.8V, preferably 0.3V to 0.6V, and minimally about 25% porosity.

The consolidated nonwoven blend is then heated, preferably in a continuous oven or by IR irradiation, to temperatures above the softening temperature of the thermoplastic. The temperature should preferably be 20° C. to 60° C. above the softening temperature. In the case of polypropylene fibers, the temperature is preferably between 180° C. and 220° C., in particular between 190° C. and 210° C. The thermoplastic melt can easily "impregnate" the individual filaments, and one obtains a substantially better and more uniform impregnation of the glass fibers than with the above mentioned GMT method, where the majority of glass fiber bundles are not opened into individual filaments. This results, for example, in poor homogeneity of the properties of finished products produced from GMT semifinished products. At this stage in the inventive process, the fibers are not surrounded by resin. Rather, the thermoplastic adheres irregularly to the reinforcing fibers, often in the form of small globules. The distribution of thermoplastic, however, is substantially uniform.

Immediately after heating, the heated nonwoven is compressed. A heated compression mold and a cooled compression mold are employed in succession. The nonwoven blend is compressed at a pressure of less than 0.8 bar, preferably 0.05 to 0.5 bar, for at least 3 seconds. In the heated compression mold the dwell time is preferably between 5 and 60 seconds, whereas in the cooled compression mold it can last for more than several minutes. The upper limit of 0.8 bar is critical; at higher pressures, the air pore content becomes too low, and extensibility may become a problem. Pressures, whether areal pressure or line pressure, are measured by standard techniques. Generally speaking, the manufacturer of the press supplies instructions for measuring or calculating pressure, including in most cases, gauges for this purpose. Preferably, pressure plates are used on which two revolving fabric belts, e.g., made of teflon-coated glass or Aramid fabric, slide along the pressure plates and thereby entrain the nonwoven blend. The heated compression mold is preferably heated to more than 80° C., in particular to 100° C. to 220° C., and the cooled compression mold is preferably kept at a temperature of less than 50° C., more preferably less than 30° C., and in particular at 15° C. to 25° C. At higher temperatures of the cooled rolls, the dwell time must be lengthened, as the thermoplastic matrix material must be a solid when exiting this cool zone. Note that if not purposefully cooled, the temperature in this second zone of the press will increase to a relatively high level due to contact with the heated product.

If the composite is not cooled under pressure, the higher modulus of the reinforcing fibers will, in conjunction with the molten or hot thermoplastic, cause severe and unpredictable lofting of the composite sheet. Such lofted sheets contain too many air voids, and are difficult to thermoform. In particular, heating prior to thermoforming is difficult. Likewise, if the cooling pressure is too high, a product with low stiffness, and which is difficult to handle, will be produced. Too much pressure during cooling will also damage pressure sensitive surface layers.

In a further embodiment, the cooled intermediate product produced as described herein is reheated uniformly to the melt temperature of the thermoplastic matrix or above, while being under little or no pressure, and allowing the product to expand uniformly in the thickness direction to produce a thicker and correspondingly less dense product which may be thermoformed to finished products which also have low density. The re-expansion of the web to form this lower density intermediate product may take place after full consolidation in the double band press, i.e. as a separate step, or the expansion may be allowed in the cooling zone of the press by lowering the pressure in that section or establishing essentially pressureless contact. Such materials cannot be made by allowing the hot consolidated product from the heated zone of the press to exit the press and rise unconstrained, since expansion under these conditions will produce an irregular and commercially unacceptable product. The increase in thickness must be limited by contact, either in a double band press or other type of press. For example, cut sheets of dense intermediate product with an air void content of 40% and a thickness of 2 mm may be heated within a press having a 3 mm gap. Upon expansion to 3 mm, further expansion is restrained. The product is preferably cooled in this condition, which is why the use of a double band press is preferred. If a platten press or the like is used, it is preferable to heat the dense intermediate product so that the minimal thickness expansion, e.g. in local areas, is about the thickness desired in the final product or slightly more, and then the cool press is closed, exerting only so much pressure that the desired final thickness is achieved and thickness variations are eliminated.

During the compression step of the preferred process, a heated roll pair is preferably situated upstream from the heated compression mold and a cooled roll pair is preferably situated downstream from the heated compression mold. These roll pairs are preferably located within the double band press, i.e. within the continuous bands.

The heated roll pair serves mainly to supply functional layers and to apply them to the heated nonwoven blend. A low lineal or "line" pressure of less than 10 N/mm is sufficient for this purpose. The compression mold, which is preferably heated to 150° C. to 200° C., causes the reinforcing fibers to be pressed into the thermoplastic melt and to be wetted to a sufficient extent, and it also causes some of the air to be forced out. The cooled roll pair presses the functional layers tightly onto the partially consolidated semifinished product with a line pressure of preferably 10 to 50 N/mm, so that the functional layer(s) are bonded thereto. Furthermore, if desirable, the cooled roll pairs can be set to cause a further reduction in thickness. The thermoplastic melt is completely solidified by the cooled compression mold so that restoring forces can no longer act, any functional layers are firmly fused to the product, and the semifinished product is thus consolidated.

The compression operation is performed under such gentle conditions that the resulting semifinished product still has an air pore ("void") content between 25 and 75 vol %, in particular 35 to 65 vol %. Due to this fact, in contrast with compact or almost compact semifinished products, this product can be processed more easily, e.g., by thermoforming in compression molds. Due to the above mentioned uniform impregnation of the glass fibers with the thermoplastic matrix, the air pores are homogeneously distributed in the semifinished product. This is in the contrast to expanded GMT, which has an irregular distribution of air pores, and contains unopened glass fiber bundles and matrix agglomerates.

If necessary, functional layers are brought into contact with one or both sides of the heated nonwoven blend simultaneously with the compression operation and are jointly compressed. These additional layers may be decorative layers, thin fiber nonwovens, thermoplastic films or fabric sheeting, for example, and may be supplied for aesthetic and/or structural purposes. Further examples include carpeting, woven or non-woven scrim, fabrics, metal foils, metallized plastic films, wood veneer, composite films, etc. The preferred films are compatible thermoplastic films. By "compatible" is means that the thermoplastic is of the same type as the thermoplastic of the thermoplastic fibers, or can form a strong fusion bond with the thermoplastic of the thermoplastic fibers.

The resulting flat semifinished product preferably has a thickness of 0.5 mm to 10 mm, in particular from 1.0 to 5.0 mm. For special applications, the thickness may also amount to more than 10 mm. The average length (weight average) of the reinforcing fibers in the semifinished product is 15 mm to 100 mm, preferably 20 mm to 60 mm, and in particular 25 mm to 50 mm.

A further object of this invention is to provide a thermoplastically moldable semifinished product of 25 to 55 wt % of a thermoplastic material and 75 to 45 wt % reinforcing fibers with an average length (weight average) of 20 mm to 50 mm, containing 35 to 65 vol %, preferably 45 to 55 vol % air pores with uniform distribution. The semifinished product preferably has a weight per unit of area of 250 to 1800 g/m² and contains 25 wt % to 55 wt % polypropylene and accordingly 75 wt % to 45 wt % glass fibers. The glass fibers preferably have an average length (weight average) of 25 mm to 50 mm, and the fibers of the non-woven are consolidated by needling together. In another preferred embodiment, the semi-finished product contains 35 to 80 weight percent of glass fibers, the latter present predominately, preferably by more than 80%, and in particular more than 90%, as individual filaments.

Example 1

Figure 2:
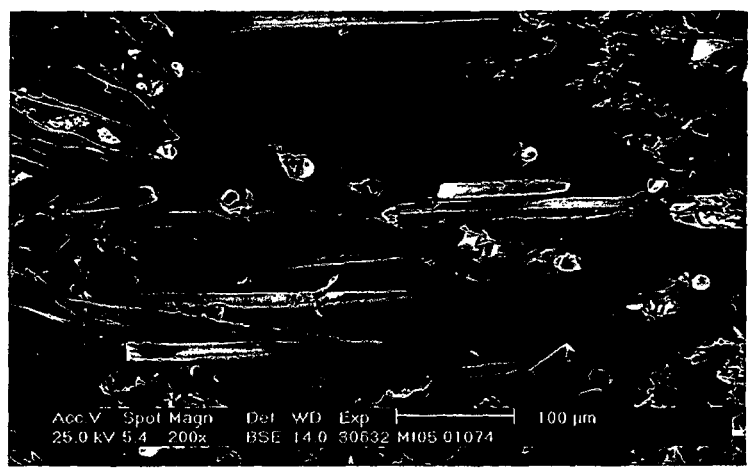
FIG. 2 is an SEM of an intermediate product of the present invention, at higher magnification.

Staple fibers of PP having a melt flow index (230° C., 2.16 kg) of 25 g/10 min and a length of about 40 mm are mixed together with chopped glass fibers having a length of 50.8 mm and a water content of about 1%. Mixing is carried out in a blending unit before providing the fibers to a continuous airlay process for further mixing, and the resulting continuous nonwoven fleece, having an areal weight of 1200 g/m², is needled from one side on a conventional needle loom. The thus preconsolidated fleece is heated in an air flow oven to about 190° C. to melt the PP and thereafter immediately conveyed to a heated double belt laminator. There it is compressed at a pressure of 0.5 bar for about 15 sec. The laminator temperature is about 150° C., to maintain the core of the fleece above the softening point of the PP and to enable it to penetrate the glass fibers homogeneously. On the other hand, due to the relatively low pressure, the three-dimensional randomly oriented glass fibers partially resists the pressure and keeps a certain portion of air voids within the fleece. Subsequently the fleece is introduced into a cold double belt laminator held at 20° C., where it is compressed at a pressure of 0.2 bar to 90 seconds to solidify the PP. The resulting semifinished product is cut to blanks having a size of 2 m by 2 m. Their thickness is 2.3 mm, the average glass fiber length is slightly less than 50 mm. The thickness in case of a full consolidation would be 1.0 mm. Consequently the calculated voids content is 55 vol. %. The homogenous voids distribution and the high degree of glass fiber filamentation can be seen by the SEM picture of FIG. 1. FIG. 2 is an enlarged view (200×) of the intermediate product. The high percentage of individual fibers (>90%) is noteworthy. The blanks show a high stiffness, no distortion and can easily be handled, e.g. by robotic handling equipment.

Comparative Example 2

Example 1 is repeated, except that compression is carried out in the heated double belt laminator at a pressure of 3 bar for 40 seconds and in the cooled double belt laminator at 2 bar for 100 seconds. The resulting semifinished product has a thickness of only 1.1 mm. A fully consolidated sheet would have a thickness of 1.0 mm. Accordingly, the calculated voids content is only 9 vol. %. Due to the high pressure neither thin films nor scrims can be applied without damage by the glass fibers. The thin large sheets can only be handled with difficulty due to their low structural stiffness.

Comparative Example 3

The same non-woven fleece (1200 g/m², 40% GF, 60% PP-Fibers) as in Example 1 is cut into 250 mm wide rolls to adjust the width to a laboratory calendering machine, having a drum dimension of 300×200 mm (width×diameter). The fleece is heated to 180° C. by passing through an air flow oven and then introduced into the calender nip. The 2 rollers of the calender are adjusted to 40° C. surface temperature, a linear load of 300 N/mm and a speed of 5 m/min. The compressed fleece shows an elongation of 100%, caused by the high pressure, and cannot be used due to extreme shape distortion and fiber orientation.

In a further trial, the linear load is reduced to 50 N/mm and the line speed to a very low 2 m/min. The heated (180° C.) fleece is compressed in the calender nip but is still useless due to high distortion and inner stress. Surface layers like PP-films of 150 micron thickness and scrims of 30 g/m² could be co-calendered, with good adhesion, but are useless due to the previously mentioned distortion and orientation of the reinforcing fibers.

By varying temperature, pressure and speed further tests are carried out, but finally no internal stress free, flat and sufficiently cooled blanks could be produced, setting the calender to efficient line speeds of more than 5 m/min.

Comparative Example 4

Figure 3:
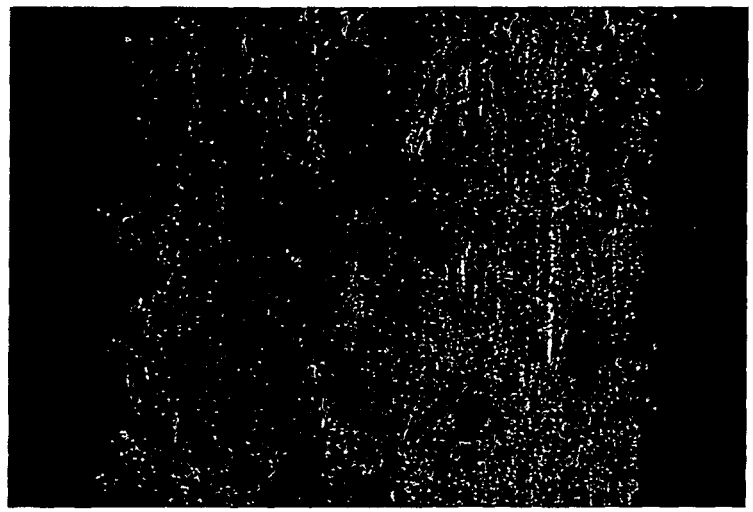
FIG. 3 is an SEM of a prior art intermediate product illustrating the non-uniform porosity.
Figure 4:
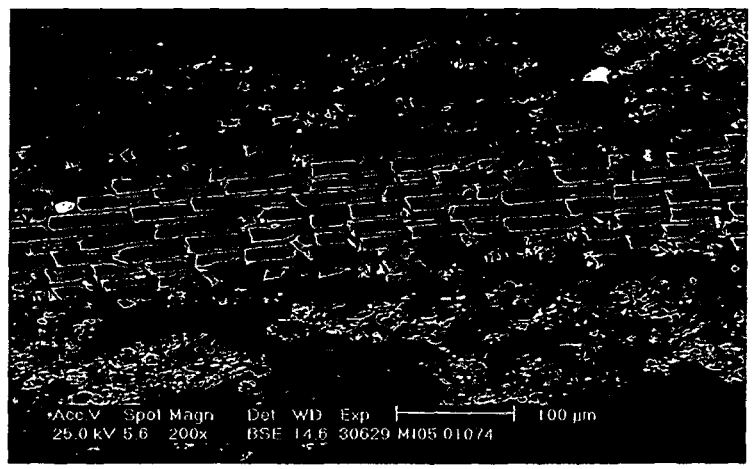
FIG. 4 is a higher magnification of the product used in FIG. 3.

As in Example 1 of DE-A-19520477, two needled glass fiber mats which together presented an areal weight of 1240 g/m² and a glass fiber length of 100 mm are impregnated with molten polypropylene of areal weight 2860 g/m² in the heated zone of a double band press at a pressure of 3 bar. In the following cooling zone, the laminate contacts the belt in a pressureless manner, whereby the impregnated mat expands due to the continued presence of molten polypropylene. Upon cooling to under 110° C., a porous, expanded intermediate product is obtained, having a glass fiber content of 30 weight percent, a density of 0.6 g/cm³, and a porosity of 50 vol. percent. The areal weight was 4100 g/m², and is too high for most automotive applications. FIG. 3 is an SEM (32×) of the product, while FIG. 4 is a further SEM (200×).

The great differences between low density intermediate products produced by "lofting" GMT by heating and allowing the mat to expand, as compared with an intermediate product of the subject invention is demonstrated by the Figures. In FIGS. 3 and 4, a GMT intermediate containing about 30 weight percent glass fibers and a ratio of unconsolidated thickness to fully consolidated thickness of 1.5:1 prepared in Comparative Example 4, has large areas with virtually no porosity and other areas which are completely pore dominated. This structure is typical of products consolidated at high pressure. FIGS. 1 and 2, on the other hand, illustrate a product of the subject invention with substantially the same glass fiber content and the same loft. The porosity is uniformly distributed.

The semifinished product produced according to the present invention may be rolled up and stored or cut immediately into sheets, e.g., with dimensions of 400 mm to 3000 mm×300 mm to 2300 mm. It may be processed thermoplastically to form three-dimensional finished parts. To do so, appropriate cut sections are first heated to temperatures above the softening temperature of the thermoplastic and then are reshaped. In doing so, the semifinished product expands due to the restoring forces of the needled fiber nonwoven; the more it expands, the greater is the air pore content. For example, a semifinished product that has expanded to more than twice its original thickness, and preferably more than three times its original thickness, can be reshaped more easily during thermoforming than a compact sheet. In reshaping, the semifinished product is compressed by means of the usual two-part molds or is shaped by deep drawing.

The finished parts can be used in the transportation sector as automotive, railway and aircraft parts, as vehicle body parts, or as large area panels and furniture parts. In addition, they may be used as cover layers in sandwich laminates for shell elements or partitions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A continuous process for the preparation of a porous thermoformable semifinished product having a porosity of from 25 volume percent to 75 volume percent from thermoplastic fibers and reinforcing fibers, comprising the steps of:

a) blending from 10 to 80 weight percent of thermoplastic fibers with 90 to 20 weight percent of reinforcing fibers, said reinforcing fibers supplied as individual fibers or as multi-fiber strands which are opened into individual fibers during blending, to form a lofty, continuous non-woven mat;

b) consolidating the lofty non-woven mat of step a) by needling or by thermal treatment which melts the thermoplastic fibers only partially to form a porous and flexible but handleable consolidated mat;

c) heating the consolidated mat to a temperature above the melting point of the thermoplastic fibers;

d) compressing the consolidated mat while still hot in a heated zone of a double band press at a pressure of 0.05 bar to 0.5 bar or less for a period of at least 3 seconds to form a densified but still porous product containing reinforcing fibers and molten thermoplastic; and e) cooling said densified porous product at a pressure of 0.5 bar or less, in a cool zone of a double band press maintained at a temperature below the melt temperature of the thermoplastic fibers, for a time period sufficient to allow the thermoplastic to solidify and form a porous semifinished intermediate product, and removing a stiff semifinished product.

2. The process of claim 1, wherein prior to or during step d), at least one functional layer is compressed onto the heated consolidated mat.

3. The process of claim 2, wherein prior to the heated zone of the double band press is positioned a heated roll pair which force the functional layer(s) against the heated consolidated mat.

4. The process of claim 3, wherein the heated roll pair exert a line pressure of from 10 to 50 N/mm.

5. The process of claim 2 wherein at least one functional layer is a molten film of a compatible thermoplastic.

6. The process of claim 1, wherein the average length of the thermoplastic fibers and the average length of the reinforcing fibers differ by no more than 25% prior to needling.

7. The process of claim 1, wherein the thermoplastic fibers and reinforcing fibers are air blended, deposited on a moving belt, and carded.

8. The process of claim 1, wherein the reinforcing fibers are supplied to the process as multi-fiber strands.

9. The process of claim 1, wherein the average fiber length of the thermoplastic fibers and the reinforcing fibers lies within the range of 20 mm to 120 mm prior to needling.

10. The process of claim 1, wherein the porosity of the porous thermoformable intermediate product is uniformly distributed.

11. The process of claim 1, wherein the heated zone of the double band press is maintained at a temperature greater than 80° C. and the cool zone of the double band press is maintained at a temperature of less than 30° C.

12. The process of claim 1, wherein a dwell time in the heated zone of the double band press is from 5 to 60 seconds.

13. The process of claim 1, wherein within the double band press following the cool zone is a cooled roll pair which exert pressure on the porous, thermoformable semifinished product, the line pressure between the cooled roll pair being from 10 to 50 N/mm.

14. The process of claim 1 wherein the amounts of thermoplastic fibers and reinforcing fibers are such that the porous, thermoformable intermediate product has a thermoplastic content of between 20 to 65 weight percent, a reinforcing fiber content between 80 and 35 weight percent, the thermoplastic fibers and reinforcing fibers each having an average length of from 20 mm to 60 mm, the porous, thermoformable semifinished product having a content of from 35% to 65% by volume of uniformly distributed porosity, and having an areal weight of between 250 to 1800 g/m².

15. The process of claim 14, wherein said reinforcing fiber comprises basalt fibers.

16. The process of claim 15, wherein basalt fibers and natural fibers are present as reinforcing fibers, in a weight ratio of 10:90 to 50:50.

17. The process of claim 1, wherein the lofty, continuous non-woven mat has a void content V of from 85 volume percent to greater than 99 volume percent, and the flexible but handleable consolidated mat is consolidated by at least one needle punching consolidation step and has a volume percent porosity of from 0.85V to 0.95V, and the porous thermoformable semifinished product has a void content of 0.25V to 0.75V and minimally 25 volume percent porosity.

18. The process of claim 1, further comprising f) allowing a porous thermoformable semifinished product formed in step (e) to re-expand to a greater thickness while at a temperature at or higher than the melting temperature of the thermoplastic and cooling under contact but at low or no pressure to form an expanded semifinished product having a thickness greater than the thickness of the porous thermoformable semifinished product.

19. The process of claim 18, wherein said step of re-expanding is accomplished by reheating the porous thermoformable semifinished product and allowing the porous thermoformable semifinished product to expand in a press, the expansion being limited by contact with the press, followed by cooling in the press.

20. The process of claim 1, wherein the pressure in step e) is lower than the pressure in step d).

21. The continuous process for the preparation of a porous thermoformable semifinished product having a porosity of from 25 volume percent to 75 volume percent from thermoplastic fibers and reinforcing fibers of claim 1, wherein step b) comprises consolidating the lofty non-woven mat of step a) by thermal treatment which melts the thermoplastic fibers only partially to form a porous and flexible but handleable consolidated mat.

\* \* \* \* \*